United States Patent
Funkhouser et al.

(12)
(10) Patent No.: US 6,192,987 B1
(45) Date of Patent: Feb. 27, 2001

(54) METAL CORROSION INHIBITORS, INHIBITED ACID COMPOSITIONS AND METHODS

(75) Inventors: Gary P. Funkhouser; Juanita M. Cassidy; Jim L. Lane; Keith Frost; Tommy R. Gardner; Karen Lynn King, all of Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/286,777

(22) Filed: Apr. 6, 1999

(51) Int. Cl.$^7$ .................................................. E21B 37/06
(52) U.S. Cl. .......................... 166/304; 166/312; 166/307
(58) Field of Search .................... 166/311, 312, 166/307, 305.1, 304, 279

(56) References Cited

U.S. PATENT DOCUMENTS

| | | | |
|---|---|---|---|
| 3,157,232 | * 11/1964 | Ramos | 166/307 |
| 3,953,340 | * 4/1976 | Templeton et al. | 252/8.55 |
| 4,493,775 | * 1/1985 | Coffey et al. | 252/8.55 |
| 4,498,997 | 2/1985 | Walker | 252/8.55 C |
| 4,552,672 | 11/1985 | Walker | 252/8.55 C |
| 4,663,059 | 5/1987 | Ford et al. | 252/8.55 C |
| 4,823,874 | 4/1989 | Ford | 166/279 |
| 4,826,565 | * 5/1989 | Susuki et al. | 156/668 |
| 5,112,505 | * 5/1992 | Jacobs et al. | 252/8.552 |
| 5,264,141 | 11/1993 | Brezinski et al. | 252/8.552 |
| 5,366,643 | 11/1994 | Walker | 252/8.555 |
| 5,441,929 | 8/1995 | Walker | 507/260 |
| 5,591,381 | 1/1997 | Walker | 252/389.54 |
| 5,622,919 | 4/1997 | Brezinski et al. | 507/90 |
| 5,622,921 | * 4/1997 | Dyer | 507/259 |
| 5,674,817 | 10/1997 | Brezinski et al. | 507/258 |
| 5,697,443 | 12/1997 | Brezinski et al. | 166/307 |
| 5,756,004 | 5/1998 | Brezinski | 252/394 |
| 5,763,368 | 6/1998 | Brezinski | 507/240 |
| 5,792,420 | 8/1998 | Brezinski | 422/12 |

* cited by examiner

Primary Examiner—David Bagnell
Assistant Examiner—Zakiya Walker
(74) Attorney, Agent, or Firm—Robert A. Kent; C. Clark Dougherty, Jr.

(57) ABSTRACT

Improved metal corrosion inhibitors, acid compositions containing the inhibitors and methods of using the acid compositions are provided by the present invention. The metal corrosion inhibitors are basically comprised of one or more acetylenic alcohols and hexamethylenetetramine.

15 Claims, No Drawings

METAL CORROSION INHIBITORS, INHIBITED ACID COMPOSITIONS AND METHODS

BACKGROUND OF THE INVENTION

1. Field of the Invention

The present invention relates to metal corrosion inhibitors, inhibited acid compositions and methods of using the acid compositions in the treatment of hydrocarbon producing wells.

2. Description of the Prior Art

Aqueous acid solutions are often utilized to treat subterranean hydrocarbon producing formations penetrated by well bores whereby the production of hydrocarbons therefrom is increased. One such production stimulation treatment generally referred to as "acidizing" involves the introduction of an aqueous acid solution into a subterranean formation under pressure so that the acid solution flows through the pore spaces of the formation. The acid reacts with acid soluble materials contained in the formation thereby increasing the size of the pore spaces and increasing the permeability of the formation. Another similar treatment known as "fracture-acidizing" involves the formation of one or more fractures in the formation and the introduction of an aqueous acid solution into the fractures to etch the fracture faces whereby channels are formed therein when the fractures close. The acid also enlarges the pore spaces in the fracture faces and in the formation.

The above described acidizing and fracture-acidizing well stimulation treatments have been performed successfully for many years. However, a continuous problem which accompanies the treatments is the corrosion of metal surfaces in pumps, tubular goods and equipment used to introduce the aqueous acid solutions into the subterranean formations to be treated. The expense associated with repairing or replacing corrosion damaged tubular goods and equipment can be very high. The corrosion of tubular goods and downhole equipment is increased by the elevated temperatures encountered in deep formations, and the corrosion results in at least the partial neutralization of the acid before it reacts with acid-soluble materials in the formations.

Another problem encountered in acidizing and fracture-acidizing hydrocarbon producing formations involves the precipitation of undesirable compounds which can damage the producing formations by filling and plugging the pore spaces therein. For example, the acid solution may dissolve iron-containing scale from pipe and equipment and iron-containing minerals present in the formation. As the acid reacts and the pH of the acid solution increases, dissolved iron present in the solution in the form of ferric ion precipitates as ferric hydroxide. The ferric hydroxide precipitate can plug the formation and thus cause serious well damage.

When the well being treated is sour, i.e., the hydrocarbon fluids produced contain a significant quantity of sulfide compounds, and particularly hydrogen sulfide, problems are often encountered as a result of the precipitation of iron sulfide from the acid treating solution. Sulfide ions reduce ferric ions to ferrous ions with the result that the precipitation of ferric hydroxide is reduced. However, elemental or free sulfur is produced in the reduction reaction which precipitates. Sulfur precipitate can also plug the formation and cause serious damage thereto.

In addition, sulfide ions react with ferrous ions to form ferrous sulfide which also can precipitate. The ferrous sulfide precipitates from an acid solution when the pH of the solution reaches a level greater than about 1.9. Because the pH level of a spent acid solution used to treat subterranean well formations is greater than 1.9, ferrous sulfide dissolved in an unspent acid solution precipitates before the acid solution becomes spent. The ferrous sulfide precipitate can also plug the treated formation and cause serious damage to the well.

While various hydrogen sulfide scavenger compositions have been developed and used heretofore to react with and tie up sulfide ion in acid solutions, such hydrogen sulfide scavengers are often ineffective at low temperatures and/or are highly toxic.

Certain crude oils contained in subterranean formations precipitate sludge upon contact with aqueous acid solutions during acidizing treatments. The precipitates formed are mainly asphaltenes, resins, paraffins and other high molecular weight hydrocarbons which, once formed, are very difficult to remove from producing formations.

Methods of preventing or reducing sludge formation upon contact between sludging oil and an aqueous acid solution have been developed and used heretofore. The methods have included combining anti-sludging agents and other additives with the aqueous acid solution whereby the precipitation of sludge is reduced when the resulting acid mixture contacts the sludging oil. While the methods and anti-sludging agents have achieved varying degrees of success, the anti-sludging agents and other additives included in the acid mixtures have often separated even though dispersants have been included therein. When the resulting non-homogeneous acid mixtures have contacted sludging oil in subterranean formations, separated portions of the acid mixtures have still caused the precipitation of sludge in the formations.

Thus, there are continuing needs for improved corrosion inhibitors, improved inhibited acid compositions and improved methods of acid treating subterranean producing formations whereby greater and more reliable corrosion inhibition of metal surfaces is provided; ferric ion dissolved in the acid compositions is reduced to ferrous ion whereby ferric hydroxide precipitates and the like are prevented; sulfide ions dissolved in the acid are prevented from reacting with iron ions whereby free sulfur or ferrous sulfide precipitates and the like are prevented; and anti-sludging agents mixed with the acid compositions are prevented from separating and allowing the precipitation of sludge.

SUMMARY OF THE INVENTION

The present invention provides improved metal corrosion inhibiting compositions, improved corrosion inhibited acid compositions and improved methods of treating subterranean hydrocarbon producing formations with the acid compositions.

The improved corrosion inhibited acid compositions of this invention can, in addition to preventing corrosion of metal surfaces, prevent the formation of ferric hydroxide precipitate, free sulfur and ferrous sulfide precipitate as well as the precipitation of sludge from a sludging oil.

The metal corrosion inhibiting compositions of this invention basically comprise one or more acetylenic alcohols and hexamethylenetetramine. The presence of a small amount of the relatively inexpensive hexamethylenetetramine with acetylenic alcohols dramatically improves the performance of the acetylenic alcohols in reducing corrosion and enables the use of the acetylenic alcohols at lower concentrations and/or higher temperatures than when the acetylenic alcohols are utilized by themselves. The hexamethylenetetramine also functions as a sulfide scavenger whereby the formation of free sulfur or the formation of ferrous sulfide precipitate are prevented. In addition to acetylenic alcohols and hexamethylenetetramine, the metal corrosion inhibiting compositions of this invention can also include solvents.

The metal corrosion inhibited acid compositions of this invention basically comprise water, an acid and an effective amount of a corrosion inhibitor of this invention as described above. The acid utilized is preferably hydrochloric acid or mixtures of hydrochloric acid and organic acids such as formic acid, acetic acid and citric acid. The corrosion inhibited acid compositions can also include an effective dispersing agent, an anti-sludging agent, a ferric iron reducer and a sulfide scavenger in the form of additional hexamethylenetetramine.

In accordance with the methods of the present invention, a subterranean hydrocarbon producing formation is treated with an acidizing composition of the invention whereby the corrosive effects of the acidizing composition on ferrous metal surfaces in contact therewith are reduced and damage to the subterranean hydrocarbon producing formation is prevented. The method comprises the steps of contacting the subterranean formation with an acidizing composition comprised of water, an acid and an effective amount of a corrosion inhibiting composition of this invention, and recovering the acidizing composition from the subterranean producing formation after it has become spent therein.

It is, therefore, a general object of the present invention to provide improved metal corrosion inhibiting compositions, corrosion inhibited acid compositions and methods of using the acid compositions.

Other and further objects, features and advantages of the present invention will be readily apparent to those skilled in the art upon a reading of the description of preferred embodiments which follows.

DESCRIPTION OF PREFERRED EMBODIMENTS

The present invention provides improved corrosion inhibiting compositions which when combined with a corrosive aqueous acid solution inhibit the corrosion of metal surfaces contacted thereby, improved corrosion inhibited aqueous acid compositions and improved methods of using the aqueous acid compositions for treating subterranean hydrocarbon producing formations whereby the production of hydrocarbons therefrom is increased.

When combined with an aqueous acid solution, the corrosion inhibiting compositions of this invention provide reliable corrosion inhibition to the resulting acid composition at temperatures in the range of from about 80° F. to about 350° F. The corrosion inhibited acid compositions of this invention are utilized to treat subterranean hydrocarbon producing formations while reducing the corrosive effects of the acid compositions on ferrous metal surfaces contacted thereby. In addition, damage to the subterranean hydrocarbon producing formations as a result of the precipitation of ferric iron compounds, sulfur and sulfur compounds and/or sludge from the oil encountered in the formations is substantially eliminated.

Acetylenic alcohols such as propargyl alcohol, hexynol and decyne diol have heretofore been utilized as corrosion inhibitors in hydrochloric acid for the protection of ferrous metals. However, acetylenic alcohols are expensive and their use at high temperatures, i.e., temperatures in the range of from about 180° F. to 350° F. has been limited by the high concentrations of acetylenic alcohols needed to achieve the desired corrosion protection. The improved corrosion inhibiting compositions of this invention are based on the discovery that when hexamethylenetetramine is added to one or more acetylenic alcohols, the performance of the acetylenic alcohols as corrosion inhibitors is dramatically improved.

The metal corrosion inhibiting compositions of the present invention basically comprise one or more acetylenic alcohols and hexamethylenetetramine. Examples of suitable acetylenic alcohols which can be utilized include 2-methyl-3-butyn-2-ol, 4-methyl-1-pentyn-3-ol, 1-hexyn-3-ol, 4-ethyl-1-octyn-3-ol, propargyl alcohol, alkoxylated propargyl alcohols, e.g., ethoxylated and propoxylated propargyl alcohols, e.g., ethoxylated and propoxylated propargyl alcohols, benzylbutynol, 1-ethynylcyclohexanol, 5-decyne-4,7-diol and mixtures thereof. Of these, propargyl alcohol, hexynol (1-hexyn-3-ol) and decyne diol (5-decyne-4,7-diol) and mixtures thereof are the most preferred.

The weight ratio of the acetylenic alcohol or alcohols used to the hexamethylenetetramine in a corrosion inhibiting composition of this invention is in the range of from about 15:1 to about 1:1. The corrosion inhibiting composition preferably also includes one or more organic solvents for the acetylenic alcohols such as isopropyl alcohol, dipropylene glycol monomethyl ether, ethylene glycol monobutyl ether and/or ethylene glycol monomethyl ether. In addition, water is preferably included in the corrosion inhibiting composition. Generally, the organic solvent or solvents are present in the corrosion inhibiting composition in an amount in the range of from about 10% to about 45% by weight of the composition. The water is included in the composition in an amount in the range of from about 10% to about 55% by weight of the composition.

The metal corrosion inhibited acid compositions of this invention basically comprise an aqueous acid solution and an effective amount of a corrosion inhibiting composition of this invention comprised of at least one acetylenic alcohol and hexamethylenetetramine.

The aqueous acid solution in the compositions preferably comprises water and hydrochloric acid or a mixture of hydrochloric acid with a carboxylic acid such as formic acid, acetic acid, citric acid and the like. The acid or mixture of acids is included in the acid solution in an amount in the range of from about 2% to about 30% by weight of the acid solution, preferably in an amount in the range of from about 5% to 28%.

The metal corrosion inhibited acid compositions of this invention are effective and can be used in subterranean producing formations having temperatures in the range of from about 80° F. to about 350° F. The compositions basically comprise an aqueous acid solution and a mixture of at least one acetylenic alcohol and hexamethylenetetramine, the weight ratio of acetylenic alcohol to hexamethylenetetramine being in the range of from about 15:1 to about 1:1 and the mixture being present in an amount in the range of from about 0.1% to about 3% by weight of the acid solutions in the compositions.

Another component which can be included in the corrosion inhibited acid compositions of this invention is an anti-sludging agent comprising of dodecylbenzenesulfonic acid. Dodecylbenzenesulfonic acid has heretofore been used as an anti-sludging agent in aqueous acid solutions. However, dodecylbenzenesulfonic acid has a low solubility in aqueous acid solutions and often readily separates in the presence of corrosion inhibiting components even when prior art dispersing agents are included therein. It has now been discovered that when a dispersing agent comprising a mixture of an ester and a salt of alpha-sulfonated fatty acids which is described in detail hereinbelow is included in the corrosion inhibited acid compositions of this invention containing dodecylbenzene-sulfonic acid, separation of the dodecylbenzenesulfonic acid and other components of the corrosion inhibited acid compositions does not take place. When used, the dodecylbenzenesulfonic acid anti-sludging agent is present in the corrosion inhibited acid compositions of this invention in an amount in the range of from about 0.1% to about 5% by weight of the aqueous acid solutions in the acid compositions.

As mentioned above, in order to prevent the anti-sludging agent, i.e., the dodecylbenzenesulfonic acid and other components in the corrosion inhibited acid compositions of this invention from separating, a dispersing agent which effectively prevents separation of the components in the corrosion inhibited acid compositions is included therein. Such a dispersing agent has been found to be a mixture of an ester and a salt of alpha-sulfonated fatty acids. A particularly suitable such dispersing agent comprises a mixture of sodium methyl-2-sulfo $C_{12}$–$C_{18}$ fatty acid ester and disodium-2-sulfo $C_{12}$–$C_{18}$ fatty acid salt, and is commercially available under the trade designation "ALPHA-STEP7 MC-48" or "ML-40" from the Stepan Company. When used, the dispersing agent is included in the corrosion inhibited acid compositions in an amount in the range of from about 5% to about 10% active material by weight of the aqueous acid solutions in the acid compositions.

Another component which can be included in the corrosion inhibited acid compositions is a ferric iron reducer for reducing ferric ion to ferrous ion and thereby eliminating ferric iron precipitation. The ferric iron reducer is preferably erythorbic acid or its salts and/or stannous chloride, but other ferric iron reducing compounds can also be utilized. As previously mentioned, the purpose of the ferric iron reducer is to prevent ferric ion from being available to form precipitates, e.g., ferric hydroxide. When erythorbic acid or its salts are used, the ferric iron reducer is present in an amount in the range of from about 0.1% to about 1% by weight of the aqueous acid solutions in the corrosion inhibited acid compositions. When stannous chloride is used, the reducer is present in an amount in the range of from about 0.05 to about 1% by weight of the aqueous acid solutions in the corrosion inhibited acid compositions.

Another component which can be included in the corrosion inhibited acid compositions of this invention is a sulfide scavenger. As mentioned above, it has been shown that hexamethylenetetramine functions very effectively as a sulfide scavenger in sour well acidizing treatments including such treatments carried out at low temperatures. While other sulfide scavengers also function effectively they are often highly toxic. Hexamethylenetetramine has a very low toxicity. As described above, the hexamethylenetetramine combines with sulfide ion in an aqueous acid solution to thereby prevent the sulfide from reacting with iron ion to form free sulfur or ferric sulfide precipitate. When used as a sulfide scavenger, additional hexamethylenetetramine is included in the corrosion inhibiting compositions of this invention in an amount of from about 0.1% to about 0.5% by weight of the aqueous acid solutions in the corrosion inhibited acid compositions.

The methods of treating a subterranean hydrocarbon producing formation with an acidizing composition whereby the corrosive effects of the acidizing composition on ferrous metal surfaces in contact therewith are reduced and damage to the subterranean hydrocarbon producing formation is prevented includes the steps of contacting the subterranean producing formation with a corrosion inhibited acidizing composition of this invention, and recovering the acidizing composition from the subterranean producing formation after the acidizing composition has become spent therein. The methods can be utilized for carrying out acidizing procedures, fracture acidizing procedures, well bore cleanout procedures and other similar procedures performed in wells with acidizing compositions. The metal surfaces contacted are protected from corrosion and where applicable, ferric iron, free sulfur and ferrous sulfide precipitates from the acidizing composition are prevented as well as the precipitation of sludge as a result of contacting sludging oils with the acidizing composition.

In order to further illustrate the corrosion inhibiting compositions, the corrosion inhibited acid compositions and the methods of this invention, the following examples are given.

EXAMPLE 1

Corrosion inhibiting compositions of the present invention were prepared by mixing a blend of acetylenic alcohols, i.e., 1-hexyn-3-ol and 5-decyne-4,7-diol with hexamethylenetetramine dissolved in an isopropyl alcohol solvent in an amount of 15% by weight of the solution. Each of the test compositions included different amounts of hexamethylenetetramine as shown in Table I below. Water was added to each of the test compositions along with a dispersing agent comprising ethoxylated fatty amine in an amount of about 20% by weight of the compositions. Portions of each test corrosion inhibiting composition were combined with portions of a 15% by weight aqueous hydrochloric acid solution to form test corrosion inhibited aqueous acid compositions containing 0.5% by volume of the test corrosion inhibiting compositions. Two additional test corrosion inhibited acid compositions were prepared, the first containing a corrosion inhibitor of the acetylenic alcohols without the hexamethylenetetramine (Test Sample No. 1 in Table I) and the second containing hexamethylenetetramine without the acetylenic alcohols (Test Sample No. 13 in Table I).

Test samples of the various corrosion inhibited acid compositions were prepared by immersing preweighed N-80 steel corrosion coupons in the composition which then was heated to a temperature of 200° F. at which it was maintained for 6 hours. After the 6 hour test periods, the corrosion coupons were removed, rinsed and weighed to determine the corrosion losses which took place during the tests. The results of these tests are given in Table I below.

TABLE I

Corrosion Losses Of Acetylenic Alcohol-Hexamethylenetetramine Inhibited Acid Compositions

| Test Sample No. | Quantity of Acetylenic Alcohols in Test Corrosion Inhibited Acid Composition, % by weight of the composition | Quantity of Hexamethylene-tetramine in Test Corrosion Inhibited Acid Composition, % by weight of the composition | Corrosion Loss, $lb/ft^2$ |
|---|---|---|---|
| 1 | 15 | 0 | 0.065 |
| 2 | 15 | 0.1 | 0.046 |
| 3 | 15 | 0.2 | 0.038 |
| 4 | 15 | 0.3 | 0.039 |
| 5 | 15 | 0.6 | 0.030 |
| 6 | 15 | 1.3 | 0.022 |
| 7 | 15 | 2.5 | 0.028 |
| 8 | 15 | 5 | 0.018 |
| 9 | 15 | 7.5 | 0.015 |
| 10 | 15 | 10 | 0.018 |

TABLE I-continued

Corrosion Losses Of Acetylenic
Alcohol-Hexamethylenetetramine Inhibited Acid Compositions

| Test Sample No. | Quantity of Acetylenic Alcohols in Test Corrosion Inhibited Acid Composition, % by weight of the composition | Quantity of Hexamethylene-tetramine in Test Corrosion Inhibited Acid Composition, % by weight of the composition | Corrosion Loss, lb/ft$^2$ |
|---|---|---|---|
| 11 | 15 | 12.5 | 0.014 |
| 12 | 15 | 15 | 0.016 |
| 13 | 0 | 15 | 0.110 |

From the test results in Table I, it can be seen that by incorporating 5% by weight hexamethylenetetramine in the acetylenic alcohol inhibitor, the corrosion loss (Test Sample No. 8) is reduced by about 3.5 times compared to the inhibitor containing only acetylenic alcohols (Test Sample No. 1).

EXAMPLE 2

An anti-sludging agent comprising dodecylbenzene-sulfonic acid was added to an aqueous acid solution containing 15% by weight hydrochloric acid in an amount of about 0.5% by weight of the resulting mixture. A corrosion inhibitor comprising a blend of acetylenic alcohols was also added to the acid solution in an amount of 1% by volume of the resulting mixture to form a corrosion inhibited aqueous acid solution.

The dispersing agent of this invention, i.e., a mixture of an ester and a salt of alpha-sulfonated fatty acids along with the other prior art dispersing agents identified in Table II below were added to test samples of the corrosion inhibited aqueous acid solution in various amounts, and after mixing, the test samples were placed in a 180° F. water bath for 2 hours. Thereafter, each test sample was inspected for separation. The results of these tests are set forth in Table II below.

TABLE II

Effectiveness Of Various Dispersants To Prevent Anti-Sludging Agent Separation
Dispersing Agent Concentration, % by volume

| Dispersing Agent Used | 0 | 0.1 | 0.2 | 0.3 | 0.4 | 0.5 |
|---|---|---|---|---|---|---|
| A[1] | Sep.[8] | Sep.[8] | Sep.[8] | disp.[10] | disp.[10] | disp.[10] |
| B[2] | Sep.[8] | Sep.[8] | Sep.[8] | Sep.[8] | Sep.[8] | Sl. Sep.[9] |
| C[3] | Sep.[8] | Sep.[8] | Sep.[8] | Sep.[8] | Sep.[8] | Sep.[8] |
| D[4] | Sep.[8] | Sep.[8] | Sep.[8] | Sep.[8] | Sep.[8] | Sep.[8] |
| E[5] | Sep.[8] | Sep.[8] | Sep.[8] | Sl. Sep.[9] | Sl. Sep.[9] | Sl. Sep.[9] |
| F[6] | Sep.[8] | Sep.[8] | Sep.[8] | Sep.[8] | Sep.[8] | Sep.[8] |
| G[7] | Sep.[8] | Sep.[8] | Sep.[8] | Sep.[8] | Sep.[8] | Sep.[8] |

[1]Mixture of ester and salt of α-sulfonated fatty acids (36% active); ALPHA-STEP7 MC-48 from Stepan Company.
[2]Hexyl derivatives of diphenyl ether sulfonates (45% active)
[3]Sodium octanesulfonate (39% active)
[4]Lauryl hydroxysultaine (50% active)
[5]Fatty amine ethoxylate (87% active)
[6]$C_{10}$—$C_{12}$ alcohol ethoxylate (100% active)
[7]Nonylphenol ethoxylate (70% active)
[8]Sep. means separated
[9]Sl. Sep. means slightly separated
[10]disp. means dispersed As can be seen from Table II, the dispersing agent comprised of a mixture of an ester and a salt of alpha-sulfonated fatty acids utilized in accordance with the present invention is far superior to the other dispersing agents tested in preventing separation of the test samples.

EXAMPLE 3

The corrosion inhibited acid compositions of this invention were tested to determine their corrosion inhibition properties. A number of test corrosion inhibited acid compositions of this invention (identified in Table III below as test acid compositions 1–6) were prepared comprising an aqueous acid solution containing 15% or 28% by weight hydrochloric acid and various quantities of a corrosion inhibitor of this invention comprised of 9.74% propargyl alcohol; 4.87% of a commercial acetylenic alcohol mixture consisting of 66% by weight 1-hexyn-3-ol, 30% by weight 5-decyne-4,7-diol and 4% by weight diisopropyl ether; 19.47% dipropylene glycol monomethyl ether; 19.47% of a commercial mixture of an ester and a salt of alpha-sulfonated fatty acids (ALPHA-STEP7 MC-48 from Stepan Co.); 4.87% hexamethylene-tetramine; and 41.58% water (all by weight of the compositions). A preweighed N-80 steel corrosion coupon was immersed in each test acid composition and heated to the temperatures given in Table III while maintaining the temperatures of the test compositions for the time periods given in Table III. After the time periods, the corrosion coupons were removed, rinsed and weighed to determine the corrosion losses which took place during the tests. The results of these tests are given in Table III below.

TABLE III

Acid Composition Corrosion Tests at Various Temperatures

| Test Acid Composition No. | Quantity of Corrosion Inhibitor, % by Vol. of Composition | Acid Conc., % by Weight of Aqueous Acid Solution | Temp., ° F. | Time, Hrs. | Corrosion Loss, lb/ft$^2$ |
|---|---|---|---|---|---|
| 1 | 0.5 | 28 | 150 | 6 | 0.006 |
| 2 | 1 | 28 | 170 | 6 | 0.004 |
| 3 | 1 | 28 | 180 | 6 | 0.026 |
| 4 | 0.3 | 15 | 150 | 6 | 0.002 |
| 5 | 0.5 | 15 | 180 | 6 | 0.003 |
| 6 | 1 | 15 | 200 | 6 | 0.005 |

From the test results given in Table III, it can be seen that the corrosion inhibited aqueous acid compositions of the present invention are effective in providing excellent corrosion protection to metal surfaces at elevated temperatures.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of treating a subterranean hydrocarbon producing formation with an acidizing composition whereby the corrosive effects of the acidizing composition on ferrous metal surfaces in contact therewith are reduced comprising the steps of:

contacting said subterranean zone with an acidizing composition comprising an aqueous acid solution and an effective amount of a corrosion inhibitor comprised of an acetylenic alcohol and hexamethylenetetramine; and recovering said acidizing composition from said subterranean producing formation after said acidizing composition has spent therein.

2. The method of claim 1 wherein said aqueous acid solution in said acidizing composition comprising of water and an acid selected from the group of hydrochloric acid, formic acid, acetic acid, citric acid and mixtures thereof.

3. The method of claim 2 wherein said acid is present in said acidizing composition in an amount in the range of from about 2% to about 30% by weight of aqueous acid solution in said composition.

4. The method of claim 1 wherein said acetylenic alcohol is selected from the group of 2-methyl-3-butyn-2-ol, 4-methyl-1-pentyn-3-ol, 1-hexyn-3-ol, 4-ethyl-1-octyn-3-ol, propargyl alcohol, ethoxylated propargyl alcohol, propoxylated propargyl alcohol, benzylbutynol, 1-ethynylcyclohexanol, 5-decyne-4,7-diol and mixtures thereof.

5. The method of claim 1 wherein acetylenic alcohol and hexamethylenetetramine in said acidizing composition are present in a weight ratio of acetylenic alcohol to hexamethylenetetramine in the range of from about 15:1 to about 1:1, and are present in an amount in the range of from about 0.1% to about 3% by weight of said acid solution in said composition.

6. The method of claim 1 wherein said acidizing composition further comprises an anti-sludging agent comprising dodecylbenzenesulfonic acid present in an amount in the range of from about 0.1% to about 5% by weight of said aqueous acid solution in said composition.

7. The method of claim 1 wherein said acidizing composition further comprises a dispersing agent comprising a mixture of an ester and a salt of alpha-sulfonated fatty acids present in an amount in the range of from about 5% to about 10% by weight of said aqueous acid solution in said composition.

8. The method of claim 1 wherein said acidizing composition further comprises a ferric iron reducer for reducing ferric ion to ferrous ion selected from the group of sodium erythorbate, stannous chloride and mixtures thereof present in an amount in the range of from about 0.05% to about 1% by weight of said aqueous acid solution in said composition.

9. A method of treating a subterranean hydrocarbon producing formation with an acidizing composition whereby the corrosive effects of the acidizing composition on ferrous metal surfaces in contact therewith are reduced comprising the steps of:

contacting said subterranean zone with an acidizing composition comprising an aqueous acid solution and a corrosion inhibitor comprised of an acetylenic alcohol, hexamethylenetetramine and a sulfide scavenger, said acetylenic alcohol and hexamethalenetetramine being present in a weight ratio of acetylenic alcohol to hexamethylenetetramine in the range of from about 15:1 to about 1:1 and being present in said acidizing composition in an amount in the range of from about 0.1% to about 3% by weight of said acid solution in said composition, and said sulfide scavenger being comprised of additional hexamethylenetetramine present in said acidizing composition in an amount in the range of from about 0.1% to about 0.5% by weight of said aqueous acid solution in said composition; and recovering said acidizing composition from said subterranean producing formation after said acidizing composition has spent therein.

10. The method of claim 9 wherein said aqueous acid solution in said acidizing composition is comprised of water and an acid selected from the group of hydrochloric acid, formic acid, acetic acid, citric acid and mixtures thereof.

11. The method of claim 10 wherein said acid is present in said acidizing composition in an amount in the range of from about 2% to about 30% by weight of aqueous acid solution in said composition.

12. The method of claim 9 wherein said acetylenic alcohol is selected from the group of 2-methyl-3-butyn-2-ol, 4-methyl-1-pentyn-3-ol, 1-hexyn-3-ol, 4-ethyl-1-octyn-3-ol, propargyl alcohol, ethoxylated propargyl alcohol, propoxylated propargyl alcohol, benzylbutynol, 1-ethynylcyclohexanol, 5-decyne-4,7-diol and mixtures thereof.

13. The method of claim 9 wherein said acidizing composition further comprises an anti-sludging agent comprised of dodecylbenzenesulfonic acid present in an amount in the range of from about 0.1% to about 5% by weight of said aqueous acid solution in said composition.

14. The method of claim 9 wherein said acidizing composition further comprises a dispersing agent comprised of a mixture of an ester and a salt of alpha-sulfonated fatty acids present in an amount in the range of from about 5% to about 10% by weight of said aqueous acid solution in said composition.

15. The method of claim 9 wherein said acidizing composition further comprises a ferric iron reducer for reducing ferric ion to ferrous ion selected from the group of sodium erythorbate, stannous chloride and mixtures thereof present in an amount in the range of from about 0.05% to about 1% by weight of said aqueous acid solution in said composition.

* * * * *